United States Patent Office 2,937,063
Patented May 17, 1960

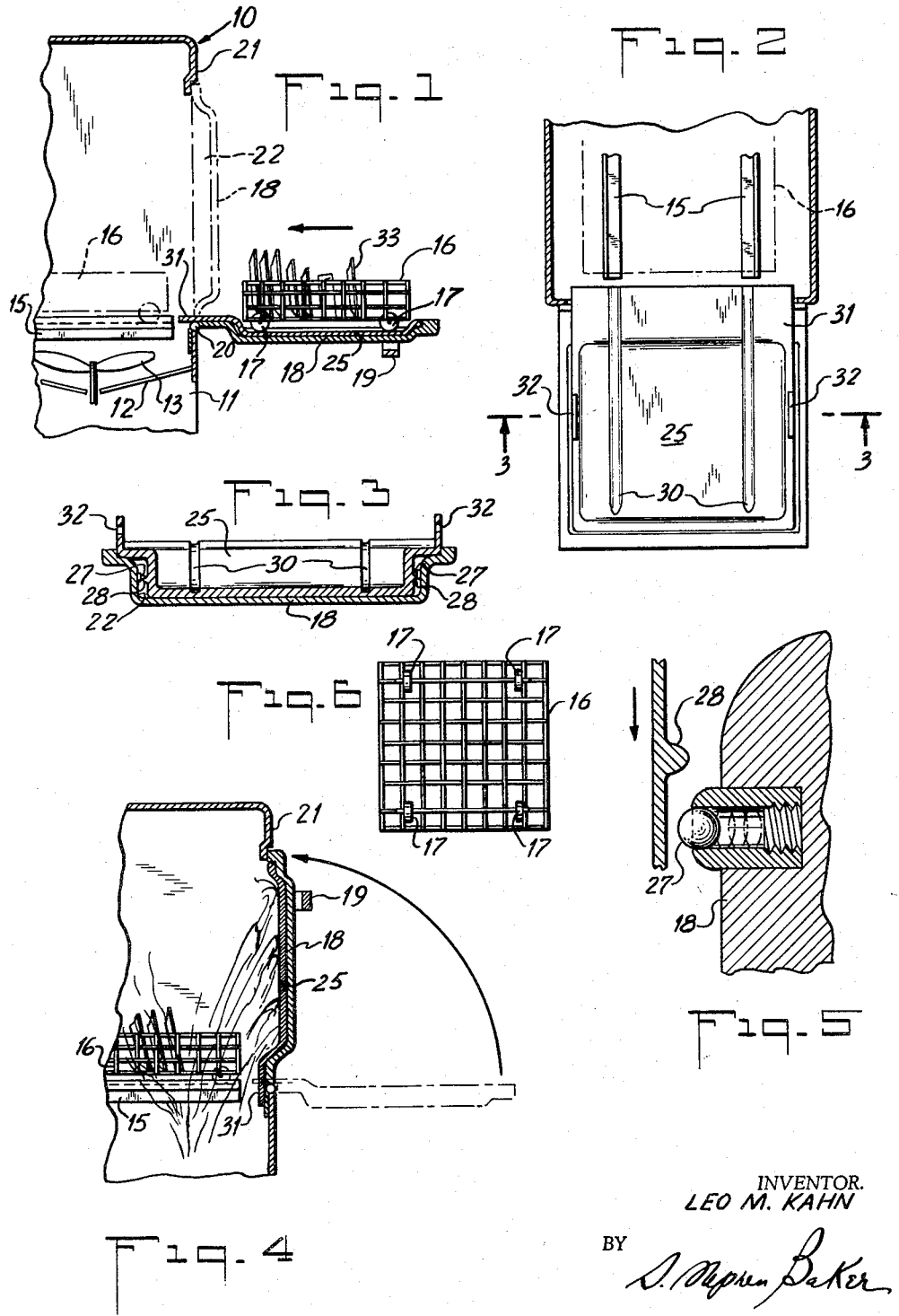

2,937,063

DISHWASHING MACHINES

Leo M. Kahn, Brooklyn, N.Y.

Application December 10, 1957, Serial No. 701,875

7 Claims. (Cl. 312—229)

This invention relates to a dishwashing machine.

In this invention I disclose a dishwashing system which is an improvement on my prior Patent No. 2,574,149 in that it includes a carrying pan which is used in conjunction with a dish holding basket, both being useable apart from the machine and arranged to be deposited therein so as to expose the dishes or other utensils to the cleaning action of the machine.

As presently constituted, washing machines are generally provided with wire baskets of various shapes and sizes, which are adapted to remain in the machine and to be loaded with dishes which are brought up to the machine. However, the provision of a separable basket with a drip pan or tray provides a great number of advantages. Thus, the combined basket and drip pan may be brought to the eating table, for example. It may then be loaded with the dishes or other utensils. The pan will be in such position that any drippings from the soiled dishes will be caught in the drip pan. The user may then carry the combined basket and drip pan to the washing machine to be inserted therein. Means are provided to then expose the dishes to the washing action of the machine and at the same time expose the soiled tray to such washing action.

After the dishes have been washed, means are provided for restoring the drip pan to its original position where it catches any drippings and it may be thus removed from the machine. Another basket and drip pan may then be inserted. Accordingly, the machine provides the advantage of not only loading the basket directly at the table but also making the machine available for a further wash while the first washing is being dried in the open air. Accordingly, the capacity of the machine in terms of time is greatly increased.

In the present invention I disclose means for simplifying the above system while rendering the device substantially foolproof in operation particularly in connection with a washing machine having a front loading door. Further, I show a system whereby the drip pan is separable from the basket, occupies very little space in the washer and requires very little modifications in the construction of present day washers.

The invention will be further understood from the following description and drawings in which:

Figure 1 is a fragmentary view in elevation, illustrating the first step in depositing the basket and tray in the washing machine;

Figure 2 is a top view of the door in the open position with the pan disposed therein;

Figure 3 is a cross-sectional view as taken along the line 3—3 of Figure 2;

Figure 4 is a fragmentary view illustrating the closing of the door and the action of the washing stage of the washing machine;

Figure 5 is an enlarged fragmentary view illustrating the releasable connection between the drip pan and the washing machine loading door; and Figure 6 is a bottom plan view of the basket.

The dishwashing machine is largely conventional. In the form shown, it comprises a cabinet-like housing 10 wherein a compartment is provided at 11 for an electric motor, not shown. Above the floor 12 of the machine is disposed the usual impeller 13 which is driven by the motor and which serves to send up a forceful spray of water to the washing compartment, all as conventional. Of course, suitable water input and drain systems, not shown, are employed.

Opposing shelves 15 serve to support a removable basket 16. Basket 16 is ordinarily fabricated of wire or the like formed so as to hold a variety of dishes, cups, silverware or the like. For purposes which will be described hereinafter, it is provided with opposing pairs of rollers 17 which are suitably journalled so as to permit the basket to be rolled on a flat surface. The underside of the basket is, of course, substantially open or latticed as illustrated in Figure 6 in order to provide access to the forceful washing medium during operation of the machine.

In the form shown, the machine includes a door 18 having a top handle 19 and a bottom horizontal hinge 20 which usually incorporates a closing spring. Door 18 is of the type which is disposed on the front wall 21 of the housing 10 so that it forms one of the vertical side walls of the machine. Door 18, it will be observed, is itself dish-shaped being formed with a well 22 on its interior surface. The well 22 serves to receive a drip pan as will hereinafter be described.

Drip pan 25 is concavo-convex with its convex side shaped complementarily to well 22. Thus, it fits snugly in well 22 somewhat in the nature of a liner therefor. Releasable locking means are provided between drip pan 25 and well 22. For this purpose, the interior of door 18 is provided with spring loaded balls 27 which engage detents 28 of drip pan 25 so as to releasably lock the drip pan to the interior of the door.

Basket 16 is adapted, by means of its rollers 17 to travel both along the drip pan 25 and along shelves 15 of the washing compartment. In order to serve as a guide, parallel, longitudinal grooves 30 are formed as tracks in drip pan 25. Rollers 17 can rest in such grooves and, upon actuation, roll along such grooves and over forward extension 31 of pan 25 onto shelves 15 which serve as continuations for drip pan tracks 30.

Extension 31 serves as a shelf on pan 25 and overlies the hinge 20 when the pan is installed in the door 18 as illustrated in Figure 1. The purpose thereof is to channel any drippings from pan 25 directly into the washing compartment instead of over the hinge as the door is closed or opened. Pan 25 is also provided with cut-outs formed in handles 32 so that it may be carried together with basket 16 as will hereinafter be described.

The machine is used as follows:

Drip pan 25, disengaged from door 18, may be brought to the eating table or to any other support. A basket 16 is supported therein with the wheels 17 in the tracks 30. Basket 16 will then be loaded with dishes 33 or with any other utensils such as cups, silverware or anything else to be washed. After the basket has been loaded, the drip pan 25 is picked up by its handle 32 and carried together with the loaded basket, over to the machine. The door 18 being open and in its horizontal position, the pan 25 is simply deposited in the well 22 whereupon its weight will generally suffice in locking the pan in the well 22 by means of the ball 27 and detent 28. However, it may obviously be pushed down for this purpose.

Thereafter, the basket 16 is pushed longitudinally inwardly, into the washing compartment. As a result, the wheels 17 roll along the tracks 30, over the extension 31 and onto the shelves 15 while the drip pan 25 remains locked in the door 18. The user then simply closes the door and the machine is turned on whereupon the impeller 13 will send a forceful spray of wash water to the substantially open underside of basket 16 so as to wash the load. At the same time it will be observed that the suspended drip pan 25, suspended substantially above the position of the basket 16, is also separately exposed to the wash water and becomes clean thereby. It will be evident that the pan 25 will probably have become soiled through the drippings of the upended dishes 33 deposited thereon at the eating table.

The machine goes through the complete washing cycle whereupon the door 18 may be opened and the basket 16 rolled back onto the clean drip pan 25. At this time, the basket 16 and pan 25 may be removed jointly and deposited outside of the machine. Any residual cleaning water from the dishes 33 will drip onto the pan 25 which is again restored to its drip receiving function. At this time, another basket 16 may be loaded with further dishes and, in conjunction with another drip pan 25 may be deposited in the machine so as to make possible the cleaning of a second load. Thus, the first load may dry outside of the machine while the second load is being washed. This greatly increases the handling capacity of the machine.

There has been shown what is now considered a preferred embodiment of the invention but it is obvious that changes and omissions may be made without departing from its spirit.

For example, the pan 25, instead of being dish shaped, could be essentially flat with grooves or dimples on its upper surface to catch drippings. Similarly, instead of supporting the basket, it may be simply supported by the basket as by employing magnets.

What is claimed is:

1. A dishwashing machine comprising a washing compartment which includes vertical side walls, means in said compartment to removably support a dish holding basket therein, a drip pan adapted to support said basket so as to receive drippings therefrom when said basket is supported thereon, and said drip pan being removably connected to the inside surface of one of said side walls so as to be exposed to the action of a washing medium in said compartment, said dish holding basket being supported horizontally in said compartment and said drip pan being supported vertically in said compartment while connected to said side wall.

2. A dishwashing machine comprising a washing compartment and having a loading door, means in said compartment to removably support a dish holding basket therein, a drip pan adapted to support said basket so as to receive drippings therefrom when said basket is supported thereon, and said drip pan being removably connected to the inside surface of said door so as to be exposed to the action of a washing medium in said compartment.

3. A dishwashing machine according to claim 2 and wherein said door is formed on a front wall of said machine, a horizontal hinge on the underside of said door, and means to support said door in horizontal position when said machine is not in operation.

4. A dishwashing machine according to claim 3 and wherein said drip pan is concavo-convex with the concave side thereof exposed to the action of said washing medium, said door having a well which complementarily receives the convex side thereof.

5. A dishwashing machine according to claim 4 and including a forward extension on said drip pan, said extension overlying said hinge when said drip pan is connected to said door.

6. A dishwashing machine according to claim 5 and wherein said basket is formed with rollers on opposing sides thereof, said pan being formed with tracks for said rollers, said baskets being rollable from a supported position on said tracks, over said extension and onto said basket supporting means in said washing compartment.

7. For use in a dishwashing machine, the subcombination of a dish carrying basket having openings on its underside to expose the dishes carried therein to the action of a washing medium injected from below, a separable dish-shaped pan underlying said basket whereby drippings from said tray will be caught in said pan, and connecting means on said pan for releasably connecting said pan, when separated from said basket, to a portion of said dishwashing machine above the position of the basket so that the pan will be suspended in the machine above the basket and separately exposed to the action of the washing medium when said machine is in operation.

References Cited in the file of this patent

UNITED STATES PATENTS

| 527,322 | Crosby | Oct. 9, 1894 |
| 958,857 | Dennis | May 24, 1910 |
| 1,048,862 | Nesbitt | Dec. 31, 1912 |
| 1,661,221 | Hall | Mar. 6, 1928 |
| 1,921,052 | Underwood | Aug. 8, 1933 |
| 2,563,652 | LeGore | Aug. 7, 1951 |
| 2,651,311 | Rule | Sept. 8, 1953 |
| 2,745,707 | Sebens | May 15, 1956 |